Patented Dec. 24, 1946

2,413,011

UNITED STATES PATENT OFFICE 2,413,011

MOLDING COMPOSITIONS

Waldorf S. Traylor, Mansfield, Mass., and David R. Wiggam, West Grove, Pa., assignors to Hercules Powder Company, Wilmington, Del., a corporation of Delaware No Drawing. Application June 19, 1943,
Serial No. 491,552

10 Claims. (Cl. 106—173)

This invention relates to a thermoplastic composition comprising ethyl cellulose and particularly to an ethyl cellulose thermoplastic composition which will provide in its cast condition a hard and substantially mar-resistant surface and will have high impact strength.

There has been a need in industry for a plastic composition such as may be formed by the casting method which will exhibit high impact strength characteristics, will be hard, tough, non-brittle and which will possess a substantially mar-resistant surface. A plastic composition having such characteristics would resemble metals in many respects and would replace metals in the forming and shaping of fabricated articles from the softer metals.

It has now been found in accordance with this invention that by a specific combination of ingredients a thermoplastic composition of ethyl cellulose base may be prepared which by a casting method will provide articles of the above-mentioned desirable characteristics. It has been found that such a composition may be prepared by compounding together in a molten condition the ingredients given below in the approximate percentage ranges so as to give a fused composition which on solidification will have a melting point by the ring and ball method within the range of about 120° C. to about 175° C.:

|  | Per cent by weight |
|---|---|
| Ethyl cellulose | 20 to 50 |
| Plasticizer | 2.5 to 35 |
| Thermoplastic resin | 3 to 30 |
| Wax | 5 to 25 |

The following examples will illustrate the preparation of the above defined plastic compositions. The parts shown in the examples are all on a weight basis.

EXAMPLE 1

A plastic composition was prepared from the following ingredients in the stated amounts:

| | Parts |
|---|---|
| Ethyl cellulose (47.5% ethoxyl, 100 centipoises viscosity) | 35 |
| Pentaerythritol ester of rosin | 20 |
| Hydrogenated methyl abietate | 15 |
| Barnsdall wax (M. P. 180–185° F.) | 10 |
| Red iron oxide | 20 |

The above ingredients were compounded together by mixing the ingredients and then colloiding the mixture on a heated two-roll mill at a temperature of 150° to 160° C. until completely colloided. The completely colloided composition was then cooled down to about 65° C. on the mill and then stripped off as a sheet.

The plastic composition so obtained was molded by the casting method at a temperature of about 220° C. to give a shaped article suitable for strength tests. The strength characteristics and other characteristics of the cast molded article were as follows:

Table I

| | |
|---|---|
| Hardness—Rockwell (M-scale) | 33 |
| Izod impact strength (ft. lb./in. of notch) | 1.0 |
| Tensile strength (lb./in.$^2$) | 920 |
| Melting point (ring and ball) °C | 158 |
| Coefficient of expansion (in./in./°C.×10$^{-5}$) | 7.5 |
| Mold contraction (in./in.) | .009 |
| Compressive strength (lbs./in.$^2$) | 9,000 |

EXAMPLES 2–4

In a similar manner to that shown in Example 1, plastic compositions were prepared from the following ingredients:

| | 2 | 3 | 4 |
|---|---|---|---|
| | Parts | Parts | Parts |
| Ethyl cellulose (47.5% ethoxyl, 50 cps. viscosity) | 35 | | |
| Ethyl cellulose (47.5% ethoxyl, 200 cps. viscosity) | | 35 | |
| Ethyl cellulose (47.5% ethoxyl, 100 cps. viscosity) | | | 30 |
| Pentaerythritol ester of rosin | 20 | 20 | 20 |
| Hydrogenated methyl abietate | 15 | 15 | 15 |
| Barnsdall wax (180–185° F.) | 10 | 10 | 10 |
| Red iron oxide | 20 | 20 | 20 |
| Diphenylamine | 1 | 1 | 1 |

The characteristics of the cast molded articles produced from each of the above fused compositions are set forth in Table II below:

Table II

| | 2 | 3 | 4 |
|---|---|---|---|
| Hardness—Rockwell (M-scale) | 46 | 55 | 8 |
| Surface hardness (pencil) | F | F | H |
| Tensile strength (lbs./in.$^2$) | 4,100 | 1,200 | 500 |
| Melting point (ring and ball) °C. | 153 | 166 | 149 |
| Coefficient of expansion (in./in./°C.×10$^{-5}$) | 10.0 | 8.9 | 5.5 |
| Mold contraction (in./in.) | .010 | .013 | .009 |
| Compressive strength (lbs./in.$^2$) | 5,300 | 6,000 | 5,150 |
| Flexural strength (lbs./in.$^2$) | 7,000 | 8,700 | 4,100 |
| Specific gravity | 1.28 | 1.24 | 1.26 |

EXAMPLES 5–9

Fused compositions were prepared from the following ingredients using the method of formulation described in Example 1:

|  | 5 | 6 | 7 | 8 | 9 |
|---|---|---|---|---|---|
| Ethyl cellulose (47.5% ethoxyl, 100 cps. visc.) | Parts 35 | Parts 35 | Parts 35 | Parts 35 | Parts 35 |
| Pentaerythritol ester of rosin | 20 | 20 | 20 |  |  |
| Glycerol ester of hydrogenated rosin |  |  |  | 20 |  |
| Bakelite BR-254 |  |  |  |  | 20 |
| Hydrogenated methyl abietate |  |  | 5 | 15 | 15 |
| Tricresyl phosphate | 15 |  |  |  |  |
| Nevinol |  | 15 |  |  |  |
| Barnsdall wax (180–185° F.) | 10 | 10 | 10 | 10 | 10 |
| Red iron oxide | 20 | 20 | 20 | 20 | 20 |
| Diphenylamine | 1 | 1 | 1 | 1 | 1 |

The characteristics of the molded articles obtained from the above compositions by the casting method at a temperature of 220° C. are set forth in Table III.

*Table III*

|  | 5 | 6 | 7 | 8 | 9 |
|---|---|---|---|---|---|
| Hardness—Rockwell (M-scale) | −22 | 19 | 25 | 17 | 55 |
| Izod impact strength (ft. lb./in. of notch) | 0.5 | 0.34 | 0.37 | 0.4 | 0.4 |
| Surface hardness (pencil) | HB | H | F | H | 2H |
| Tensile strength (lb./in.²) | 2,900 | 3,100 | 1,100 | 3,000 | 2,200 |
| Melting point (ring and ball) °C | 155 | 166 | 170 | 157 | 163 |
| Coefficient of expansion (in./in./°C.×10⁻⁵) | 10 | 9.5 | 5.5 | 5.5 | 13.3 |
| Mold contraction (in./in.) | .006 | .017 | .009 | .006 | .006 |
| Compressive strength (lbs./in.²) | 4,000 | 5,000 | 4,500 | 6,200 | 9,500 |
| Flexural strength (lbs./in.²) | 3,300 | 5,500 | 2,400 | 3,600 | 3,900 |
| Specific gravity | 1.34 | 1.34 | 1.31 | 1.32 | 1.33 |

EXAMPLES 10–14

Additional fused compositions were prepared according to the fusion procedure described in Example 1 utilizing the following ingredients:

|  | 10 | 11 | 12 | 13 | 14 |
|---|---|---|---|---|---|
| Ethyl cellulose (47.5% ethoxyl, 100 cps. visc.) | Parts 35 | Parts 35 | Parts 35 | Parts 35 | Parts 35 |
| Pentaerythritol ester of rosin | 20 | 20 | 20 | 20 | 20 |
| Hydrogenated methyl abietate | 15 | 15 | 15 | 15 | 35 |
| Paraffin (56° C.) | 10 |  |  |  |  |
| Acrawax |  | 10 |  |  |  |
| Superla wax |  |  | 5 |  |  |
| Barnsdall wax (180–185° F.) |  |  |  | 10 | 10 |
| Red iron oxide | 20 | 20 | 20 |  |  |
| Zinc oxide |  |  |  | 20 |  |
| Diphenylamine | 1 | 1 | 1 | 1 | 1 |

The molded articles obtained by casting the above fused compositions at a temperature of 220° C. had characteristics as set forth in Table IV below.

*Table IV*

|  | 10 | 11 | 12 | 13 | 14 |
|---|---|---|---|---|---|
| Hardness—Rockwell (M-scale) | 29 | 10 | 21 | 23 | 17 |
| Izod impact strength (ft. lb./in. of notch) | .19 | .27 | .18 | .54 | .70 |
| Surface hardness (pencil) | F | H | F | F | F |
| Tensile strength (lb./in.²) | 4,000 | 3,700 | 4,300 | 980 | 2,300 |
| Melting point (ring and ball) °C | 150 | 140 | 153 | 162 | 157 |
| Coefficient of expansion (in./in./°C.×10⁻⁵) | 14.5 | 14.5 | 8.3 | 8.6 | 18 |
| Mold contraction (in./in.) | .004 | .003 | .006 | .008 | .008 |
| Compressive strength (lbs./in.²) | 7,300 | 8,900 | 7,800 | 4,300 | 6,900 |
| Flexural strength (lbs./in.²) | 7,300 | 5,700 | 4,800 | 5,000 | 5,800 |
| Specific gravity | 1.29 | 1.30 | 1.31 | 1.27 | 1.09 |

The ethyl cellulose which may be used in the plastic compositions of the invention is quite critical as to ethoxyl content and viscosity. Ethyl cellulose of less than about 45.5% ethoxyl content has too high a fusion point, provides poor colloiding characteristics and exhibits graining. Similar deficiencies exist for ethyl cellulose of above 50% ethoxyl content. Viscosity types below 20 centipoises are unsatisfactory particularly on account of their low strength characteristics. Viscosity types above 1000 centipoises are not satisfactory because of low pourability. It has been found, in accordance with this invention, that the operable range of ethoxyl contents for use in the compositions of this invention is from 45.5 to 50%, and the operable range of viscosity is from 20 centipoises to 1000 centipoises. An ethoxyl content from about 46.8 to about 49% and a viscosity from about 50 to about 1000 centipoises have been found particularly desirable and are preferred. The viscosities indicated are those of a 5% by weight solution of ethyl cellulose in a solvent consisting of 80% toluene and 20% 2B-alcohol at 25° C. The amount of ethyl cellulose to be included in the compositions of the invention will be from about 20 to about 50% by weight based on the weight of the total composition, and preferably will be from about 30 to about 40% of the composition.

The plasticizer included in the compositions of the invention provides pourability and operates to soften the ethyl cellulose. The plasticizer also reduces mold shrinkage and prevents mold distortion. Suitable plasticizers are, for example, methyl abietate, hydrogenated methyl abietate, hydrogenated ethyl abietate, tricresyl phosphate, triphenyl phosphate, tributyl phosphate, methyl phthalyl methyl glycollate, ethyl phthalyl ethyl glycollate, mineral oil, "Nevinol" (coal tar distillate of B. P. 300–370° C.), raw and blown soya bean oil, raw and blown castor oil, butyl stearate, tallow, di-2-ethylbutyrate of triethylene glycol, etc. The amount of plasticizer which is desirable will vary with the other ingredients used in the compositions and with the different plasticizers themselves. Usually an amount of plasticizer in the range of about 2.5 to about 35% will be used, and preferably from about 5 to about 15%. Some resins and some waxes exert a softening action on ethyl cellulose and thus act as plasticizers. When such resins or waxes are used the amount of plasticizer needed is reduced and may in certain cases be reduced to less than 2.5%.

A wax is included in the compositions of the invention to improve the pourability of the compositions and to provide good mold release characteristics. The wax also exerts a softening action on the composition in the amounts used. Both low melting and high melting waxes are useful. Waxes of petroleum origin are quite satisfactory. Waxes which are particularly desirable are, for example, high melting microcrystalline petroleum waxes, such as "Barnsdall" wax, "Syncera" wax, "Stanolind," "Superla," and "Cerise," carnauba wax, montan wax, beeswax, hydrogenated castor oil, "Acrawax," candelilla wax, stearic acid, paraffin waxes, para terphenyl, "Rezo" wax, etc. The proportion of wax included will generally be from about 5% to about 25% by weight based on the total weight of the composition and preferably from about 10% to about 15%.

The resin component of the plastic composition adds hardness, rigidity and mar resistance to the formulation and enables the production of high melting compositions of desirable strength characteristics. The resins which are desirable are those which are compatible with ethyl cellulose in the proportion used and which are thermoplastic. The resins utilized should have low acid numbers to avoid any degrading influence on the ethyl cellulose at the elevated temperatures. Resins which are particularly suitable are the glycerol, pentaerythritol or higher polyhydric alcohol esters of rosin, hydrogenated rosin, polymerized rosin or heat-treated rosin, alkyd resins modified with any of the above rosins, oil modified alkyds, maleic modified rosin-polyhydric alcohol esters, phenol-formaldehyde resins modified with any of the above rosins, 100% phenolic resins, coumarone-indene resins, etc. The proportion of resin included in the formulation will generally be from about 3% to about 30% by weight based on the total weight of the composition and more preferably from about 10% to about 20%. The amount of resin used will depend somewhat on the characteristics of the particular resin and on the amounts of plasticizer and wax included in the formulation. The melting point of the resin will also control the amount to be used in general, since the softer resins when used in large amount exert too great a softening action.

The filler shown in most of the examples serves principally as a cheapening ingredient and is not necessary to provide the desirable strength characteristics, as will be readily evident from Example 14 which contains no filler. The fillers which may be used are those which are of the non-flocculent and non-fibrous type and which do not decompose at the temperatures used. The extremely hard fillers such as silicates are undesirable because they scratch soft metal surfaces brought in contact with the cast molded article. Red iron oxide is a very desirable filler. Zinc oxide is also very satisfactory. Other fillers which may be used with good results are, for example graphite, bentonite, barytes, chalk, carbon black, burnt umber, asbestine, etc. The amount of filler to be incorporated will depend on the amount of cheapening desired for any particular commercial application.

The ingredients of the plastic composition in the above stated amounts may be compounded either by a hot melt method involving stirring of the ingredients together until a uniform composition is provided or by milling on hot rolls or in internal mixers of the Banbury type. The milling method is advantageous since it requires relatively lower temperatures for successful compounding than are necessary in the hot melt method. In using the hot melt method of compounding care should be exercised to prevent local superheating with consequent degradation of the ethyl cellulose which will detract from the strength characteristics of the cast molded article. In employing the hot melt method, temperatures of about 200° C. to about 240° C. are desirable, while in the case of the milling method, the temperature of the heated rolls may be from about 135° to about 160° C. to provide plastic compositions of good uniformity. Other methods of compounding the components may be used if desired.

In most of the examples a small amount of diphenylamine has been included to serve as a stabilizing agent for the ethyl cellulose. In melting and remelting the compositions of the invention some degradation and decrease in viscosity of the ethyl cellulose may occur in the absence of the stabilizing agent. Thus, the stabilizing agent is not essential but is desirable when the composition is to be subjected to repeated remelting operations. Stabilizing agents besides diphenylamine which may be used are, for example, phenyl beta naphthylamine, carbazole, diphenylguanidine, sym. dibetanaphthyl paraphenylene diamine, hydroquinone monobenzyl ether, hydroquinone monomethyl ether, hydroquinone monobutyl ether, hydroquinone monoamyl ether; copper salts such as copper naphthenate, cupric nitrate, copper ammonium chloride, cupric sulfate, cupric chloride, cupric acetate, etc. The amount of stabilizer included in the composition will preferably be no more than the amount necessary to provide the desired heat stability and will not exceed about 5 parts per 100 parts of the fused composition. Preferably the amount of stabilizer used, if any is necessary, will be from about 0.5 to about 1.5 parts per 100 parts of composition.

The designated ingredients of the cast molding compositions described above are formulated by the indicated method and in the ranges given so as to provide fused compositions which on solidification will have a melting point by the ring and ball method within the range of about 120° C. to about 175° C. and preferably from about 140° C. to about 160° C. Within these melting point ranges, the combinations of ingredients shown will be useful in their cast molded form as substitutes for zinc alloy in the making of dies, tools, jigs and fixtures for the forming and shaping of light metals such as aluminum. The compositions have been found to be very suitable in forming and shaping tools used in the aircraft industry for sheet aluminum. A particular advantage of the compositions in the tool, die and jig industry is the possibility of remelting the composition when desired for reshaping. In this manner, the composition of a particular tool, jig or die may be used over and over again. This has not been possible practically with the metal tools, jigs and dies used. The hardness of the compositions is slightly less than the hardness of aluminum and as a consequence no marring of the aluminum surface occurs in contacting with the cast composition. The compositions are also well adapted for other uses where a hard and tough remeltable plastic composition is desired.

The various physical characteristics which have been shown in the examples in describing the cast molded articles obtained from the fused compositions described were measured according to the well recognized methods for each as applied in the plastics industry. The surface hardness values given as pencil hardness serve as a measure of the mar resistance of the surface of the cast plastic. The method of determining pencil hardness is that used on protective coating films. A mar resistance in terms of pencil hardness of at least 4B is generally desirable in the compositions of this invention, but preferably a pencil hardness of HB or harder is desirable.

What we claim and desire to protect by Letters Patent is:

1. A thermoplastic casting composition suitable to be melted and poured into molds to form such objects as tools, dies, and jigs comprising the following ingredients in the following percentage by weight ranges:

Ethyl cellulose (45.5 to 50% ethoxyl, viscosity 20 to 1000 centipoises) _____ 20 to 50
Plasticizer _____ 2.5 to 35
Thermoplastic resin, compatible with the ethyl cellulose in the proportion used and having substantially no degrading influence thereon at elevated temperatures _____ 3 to 30
Wax _____ 5 to 25 the above ingredients being proportioned within the above stated ranges to give the composition the characteristic of ready flowability for casting without pressure and without substantial decomposition at a temperature of 220° C. and a melting point by the ring and ball method between about 120° C. and 175° C., the said composition being further characterized by having at normal temperatures in its solidified condition a hard, substantially mar-resistant surface.

2. In a process for preparing a die useful for shaping metals such as aluminum and magnesium, the steps comprising mixing the following ingredients in the following percentage by weight ranges:

| | |
|---|---|
| Ethyl cellulose (46.8 to 49% ethoxyl, viscosity 50 to 1000 centipoises) | 20 to 50 |
| Plasticizer | 2.5 to 35 |
| Thermoplastic resin, compatible with the ethyl cellulose in the proportion used and having substantially no degrading influence thereon at elevated temperatures | 3 to 30 |
| Wax | 5 to 25 | the above ingredients being proportioned within the above stated ranges to give the composition the characteristic of ready flowability for casting without pressure and without substantial decomposition at a temperature of 220° C. and a melting point by the ring and ball method between about 120° C. and 175° C., the said composition being further characterized by having at normal temperatures in its solidified condition a hard, substantially mar-resistant surface, colloiding the resulting mixture, heating said colloided mixture to about 220° C., and pouring the heated colloided mixture into a die mold.

3. A tool or die suitable for forming sheet metal composed of a cast composition comprising the following ingredients in the following percentage by weight ranges:

| | |
|---|---|
| Ethyl cellulose (45.5 to 50% ethoxyl, viscosity 20 to 1000 centipoises) | 20 to 50 |
| Plasticizer | 2.5 to 35 |
| Thermoplastic resin, compatible with the ethyl cellulose in the proportion used and having substantially no degrading influence thereon at elevated temperatures | 3 to 30 |
| Wax | 5 to 25 | the above ingredients being proportioned within the above stated ranges to give the composition the characteristic of ready flowability for casting without pressure and without substantial decomposition at a temperature of 220° C. and a melting point by the ring and ball method between about 120° C. and 175° C., the said composition being further characterized by having at normal temperatures in its solidified condition a hard, substantially mar-resistant surface.

4. A thermoplastic casting composition suitable to be melted and poured into molds to form such objects as tools, dies, and jigs comprising the following ingredients in the following percentage by weight ranges:

| | |
|---|---|
| Ethyl cellulose (46.8 to 49% ethoxyl, viscosity 50 to 1000 centipoises) | 30 to 40 |
| Plasticizer | 5 to 15 |
| Thermoplastic resin, compatible with the ethyl cellulose in the proportion used and having substantially no degrading influence thereon at elevated temperatures | 10 to 20 |
| Wax | 10 to 15 | the above ingredients being proportioned within the above stated ranges to give the composition the characteristic of ready flowability for casting without pressure and without substantial decomposition at a temperature of 220° C. and a melting point by the ring and ball method between about 140° C. and 160° C., the said composition being further characterized by having at normal temperatures in its solidified condition a hard, substantially mar-resistant surface.

5. A thermoplastic casting composition suitable to be melted and poured into molds to form such objects as tools, dies, and jigs comprising the following ingredients in the following percentage by weight ranges:

| | |
|---|---|
| Ethyl cellulose (46.8 to 49% ethoxyl, viscosity 50 to 1000 centipoises) | 20 to 50 |
| Plasticizer | 5 to 15 |
| Thermoplastic resin, compatible with the ethyl cellulose in the proportion used and having substantially no degrading influence thereon at elevated temperatures | 10 to 20 |
| Wax | 10 to 15 | said composition also containing a filler, the above ingredients being proportioned within the above stated ranges to give the composition the characteristic of flowability without pressure at a temperature of 220° C. and a melting point by the ring and ball method between about 120° C. and 175° C., the said composition being further characterized by having at normal temperatures in its solidified condition a hard, substantially mar-resistant surface, and by its substantial resistance to decomposition at melting and casting temperatures.

6. A thermoplastic casting composition suitable to be melted and poured into molds to form such objects as tools, dies, and jigs comprising the following ingredients in the following percentage by weight ranges:

| | |
|---|---|
| Ethyl cellulose (46.8 to 49% ethoxyl, viscosity 50 to 1000 centipoises) | 30 to 40 |
| Hydrogenated methyl abietate | 5 to 15 |
| Pentaerythritol ester of rosin | 10 to 20 |
| Wax | 10 to 15 | said composition also containing an iron oxide, the above ingredients being proportioned within the above stated ranges to give to the composition the characteristics of flowability without pressure at a temperature of 220° C. and a melting point by the ring and ball method between about 140° C. and about 160° C., the said composition being further characterized by having at normal temperatures in its solidified condition a hard, substantially mar-resistant surface, and by its substantial resistance to decomposition at melting and casting temperatures.

7. A thermoplastic casting composition suitable to be melted and poured into molds to form such objects as tools, dies, and jigs comprising the following ingredients in the following percentage by weight ranges:

| | |
|---|---|
| Ethyl cellulose (46.8 to 49% ethoxyl, viscosity 50 to 1000 centipoises) | 20 to 50 |
| Plasticizer | 2.5 to 35 |
| Thermoplastic resin, compatible with the ethyl cellulose in the proportion used and having substantially no degrading influence thereon at elevated temperatures | 3 to 30 |
| Wax | 5 to 25 | said composition also including an ethyl cellulose stabilizing agent, the above ingredients being proportioned within the above stated ranges to give the composition the characteristic of ready flowability for casting without pressure and without substantial decomposition at a temperature of 220° C. and a melting point by the ring and ball method between about 120° C. and 175° C., the said composition being further characterized by having at normal temperatures in its solidified condition a hard, substantially mar-resistant surface.

8. A thermoplastic casting composition suitable to be melted and poured into molds to form such objects as tools, dies, and jigs comprising the following ingredients in the following percentages by weight:

| | |
|---|---|
| Ethyl cellulose (47.5% ethoxyl, 50 centipoises viscosity) | 35 |
| Pentaerythritol ester of rosin | 20 |
| Hydrogenated methyl abietate | 15 |
| Microcrystalline petroleum wax (M. P. 180–185° F.) | 10 |
| Red iron oxide | 20 |
| Diphenylamine | 1 | the above composition having the characteristic of flowability without pressure at a temperature of 220° C., a melting point by the ring and ball method of about 153° C. and a Rockwell hardness of about 46, said composition being further characterized by its substantial resistance to decomposition at melting and casting temperatures.

9. A thermoplastic casting composition suitable to be melted and poured into molds to form such objects as tools, dies, and jigs comprising the following ingredients in the following percentages by weight:

| | |
|---|---|
| Ethyl cellulose (47.5% ethoxyl, 100 centipoises viscosity) | 35 |
| Pentaerythritol ester of rosin | 20 |
| Hydrogenated methyl abietate | 15 |
| Paraffin (M. P. 56° C.) | 10 |
| Red iron oxide | 20 |
| Diphenylamine | 1 | the above composition having the characteristic of flowability without pressure at a temperature of 220° C., a melting point by the ring and ball method of about 150° C. and a Rockwell hardness of about 29, said composition being further characterized by its substantial resistance to decomposition at melting and casting temperatures.

10. A thermoplastic casting composition suitable to be melted and poured into molds to form such objects as tools, dies and jigs comprising the following ingredients in the following proportions by weight: ethyl cellulose about 35%, a thermoplastic resin compatible with the ethyl cellulose and having substantially no degrading influence thereon at elevated temperature about 20%, inorganic filler about 20%, the remainder of the composition comprising a plasticizer for the ethyl cellulose and a wax, as a mold lubricant, said composition being characterized by having at normal temperatures in its solidified condition a hard, substantially mar-resistant surface.

WALDORF S. TRAYLOR.
DAVID R. WIGGAM.